US00RE42937E

(19) United States
(12) Reissued Patent
Lasher et al.

(10) Patent Number: US RE42,937 E
(45) Date of Reissued Patent: Nov. 22, 2011

(54) AUTOMATIC PRESCRIPTION FILLING, SORTING AND PACKAGING SYSTEM

(75) Inventors: Christopher J. Lasher, Ridgewood, NJ (US); Dennis W. Rice, Flanders, NJ (US); Michael J. Szesko, Freehold, NJ (US); Frank Modrowsky, Branchburg, NJ (US); James McErlean, Union Dale, PA (US); Michael Kennedy, Doylestown, PA (US); Paul Thomas Shupert, Parkton, MD (US)

(73) Assignee: Medco Health Solutions, Inc., Franklin Lakes, NJ (US)

(21) Appl. No.: 12/235,242

(22) Filed: Sep. 22, 2008

Related U.S. Patent Documents

Reissue of:
(64) Patent No.: 5,771,657
Issued: Jun. 30, 1998
Appl. No.: 08/646,016
Filed: May 7, 1996

U.S. Applications:
(62) Division of application No. 09/608,013, filed on Jun. 30, 2000, now Pat. No. Re. 40,510.

(51) Int. Cl.
*B65B 57/20* (2006.01)

(52) U.S. Cl. ..... 53/55; 53/131.4; 53/168; 53/251; 53/473; 53/493

(58) Field of Classification Search ..... 53/55, 495, 53/493, 473, 411, 168, 238, 240, 237, 251, 53/249, 131.4, 131.2
See application file for complete search history.

(56) References Cited

U.S. PATENT DOCUMENTS

| | | | | |
|---|---|---|---|---|
| 2,618,420 | A | | 11/1952 | Levine |
| 3,139,713 | A | | 7/1964 | Merrill et al. |
| 3,193,196 | A | | 7/1965 | Merrill et al. |
| 3,653,176 | A | * | 4/1972 | Gess ..... 53/64 |
| 3,677,437 | A | | 7/1972 | Haigler |
| 3,803,556 | A | * | 4/1974 | Duffy ..... 700/226 |
| 4,013,192 | A | | 3/1977 | Pillon et al. |
| 4,018,358 | A | | 4/1977 | Johnson et al. |
| 4,111,332 | A | | 9/1978 | Hurst et al. |
| 4,112,332 | A | | 9/1978 | Veith et al. |
| 4,171,065 | A | | 10/1979 | Hurst |
| 4,239,435 | A | * | 12/1980 | Weiss et al. ..... 198/349.8 |
| 4,336,589 | A | | 6/1982 | Smith et al. |
| 4,363,685 | A | * | 12/1982 | White ..... 156/212 |
| 4,542,808 | A | | 9/1985 | Lloyd, Jr. et al. |
| 4,567,988 | A | | 2/1986 | Weibel et al. |

(Continued)

OTHER PUBLICATIONS

Automated Material Handling Products, S.I. Handling Systems, Inc. Jan. 8, 1990.

(Continued)

*Primary Examiner* — Paul R Durand
(74) *Attorney, Agent, or Firm* — Stroock & Stroock & Lavan LLP

(57) ABSTRACT

In an automated prescription dispensing and packing system, empty prescription bottles are labeled and loaded in assigned locations in carriers. Pills are automatically dispensed into the prescription bottles in the carriers. Ranks of carriers containing filled prescription bottles are assembled at stations where the bottles are unloaded and packed into shipping containers with literature printed by the system. Multiple bottles of an order are automatically packed in the same shipping container.

18 Claims, 11 Drawing Sheets

U.S. PATENT DOCUMENTS 4,647,333 A * 3/1987 Voltmer et al. ..... 156/351
4,655,026 A 4/1987 Wigoda
4,664,289 A 5/1987 Shimizu et al.
4,672,553 A * 6/1987 Goldberg ..... 700/216
4,674,259 A 6/1987 Hills
4,695,954 A * 9/1987 Rose et al. ..... 221/15
4,733,362 A 3/1988 Haraguchi et al.
4,766,542 A * 8/1988 Pilarczyk ..... 705/3
4,839,829 A * 6/1989 Freedman ..... 715/751
4,847,764 A 7/1989 Halvorson
4,869,394 A 9/1989 Hurst
4,870,799 A 10/1989 Bergerioux et al.
4,874,281 A 10/1989 Bergerioux et al.
4,918,604 A * 4/1990 Baum ..... 221/5
4,953,745 A 9/1990 Rowlett, Jr.
4,972,657 A 11/1990 McKee
4,980,292 A * 12/1990 Elbert et al. ..... 422/63
5,081,816 A * 1/1992 Cardinali ..... 53/54
5,097,652 A 3/1992 Inamura et al.
5,208,762 A * 5/1993 Charhut et al. ..... 700/216
5,322,406 A 6/1994 Pippin et al.
5,336,359 A * 8/1994 Pituch et al. ..... 156/568
5,337,919 A * 8/1994 Spaulding et al. ..... 221/2
5,348,061 A 9/1994 Riley et al.
5,454,206 A * 10/1995 Bailer et al. ..... 53/157
5,481,855 A 1/1996 Yuyama et al.
5,502,944 A 4/1996 Kraft et al.
5,511,594 A * 4/1996 Brennan et al. ..... 141/98
5,533,606 A 7/1996 Yuyama et al.
5,597,995 A * 1/1997 Williams et al. ..... 235/375
5,660,305 A * 8/1997 Lasher et al. ..... 221/206
5,671,592 A * 9/1997 Yuyama et al. ..... 53/493
5,688,361 A * 11/1997 Itoh ..... 156/362
5,720,154 A * 2/1998 Lasher et al. ..... 53/411
5,761,877 A * 6/1998 Quandt ..... 53/155
5,765,606 A * 6/1998 Takemasa et al. ..... 141/104
5,771,657 A * 6/1998 Lasher et al. ..... 53/55
5,771,667 A * 6/1998 McGregor et al. ..... 53/469
5,946,883 A * 9/1999 Yuyama et al. ..... 53/154
6,064,921 A * 5/2000 Pippin et al. ..... 700/242
6,317,648 B1 * 11/2001 Sleep et al. ..... 700/216
6,522,945 B2 * 2/2003 Sleep et al. ..... 700/225
6,691,490 B1 * 2/2004 Yuyama et al. ..... 53/131.4
6,721,762 B1 * 4/2004 Levine et al. ..... 707/104.1
7,412,809 B2 * 8/2008 Yuyama et al. ..... 53/244
RE40,510 E * 9/2008 Lasher et al. ..... 53/55
7,430,838 B2 * 10/2008 Rice et al. ..... 53/55
7,454,880 B1 * 11/2008 Austin et al. ..... 53/411
7,500,337 B2 * 3/2009 Yuyama et al. ..... 53/131.2
7,530,210 B2 * 5/2009 McGuinness, Jr. ..... 53/411
2006/0107623 A1 * 5/2006 Rice et al. ..... 53/494

OTHER PUBLICATIONS

"Baker Lockouts: Persistence Pays off," Quality Bulletin, Mar. 1993.
"Baker Lockouts: Persistence Pays Off", *Quality Bulletin,* Mar. 1993.

* cited by examiner

AUTOMATIC PRESCRIPTION FILLING, SORTING AND PACKAGING SYSTEM

Matter enclosed in heavy brackets [ ] appears in the original patent but forms no part of this reissue specification; matter printed in italics indicates the additions made by reissue.

*This application is a Divisional Application of U.S. application Ser. No. 09/608,013 filed Jun. 30, 2000 entitled AUTOMATIC PRESCRIPTION FILLING, SORTING AND PACKAGING SYSTEM now U.S. Pat. No. Re 40,510 which is a Reissue Application of U.S. Pat. No. 5,771,657 issued Jun. 30, 1998 entitled AUTOMATIC PRESCRIPTION FILLING, SORTING AND PACKAGING SYSTEM, each of which is hereby incorporated by reference herein in its entirety.*

*Notice: More than one reissue application has been filed for the reissue of U.S. Pat. No. 5,771,657. The reissue applications are application Ser. No. 12/235,242 (the present Divisional Reissue Application, filed on Sep. 22, 2008), application Ser. No 12/469,482 (Divisional Reissue Application filed on May 20, 2009), Ser. No. 12/473,235 (Divisional Reissue Application filed on May 28, 2009) and Ser. No. 09/608,013 (Reissue Application filed on Jun. 30, 2000) now U.S. Pat. No. Re 40,510, all of which are reissues of U.S. Pat. No. 5,771, 657.*

This invention is directed to an integrated system for automatically filling prescriptions and then assembling multiple prescriptions in a common package or unit with literature which relates to the prescription and/or marketing materials.

BACKGROUND OF THE INVENTION

The use of mail service to fill prescriptions has been highly successful in lowering the costs of providing drugs to consumers. The filling of prescriptions and mailing the filled prescriptions to consumers is labor intensive and a pharmacy can significantly reduce its costs, improve quality, and reduce turn around time by automating the prescription filling and assembling procedures.

Semi-automated prescription dispensing machines which can automatically count the tablets or capsules of a unique prescription have had a significant impact in the drug industry. However, use of these machines still require many manual steps to complete a patient's order. For example, the positioning of the bottle under the proper chute is controlled by a technician or pharmacist and after filling the bottle, the prescription has to be further handled manually to effect mailing of the prescription to the patient.

Patients or families using mail services to fill prescriptions often receive multiple prescriptions. Data suggests that about 50 percent of mail service for prescription drugs involves orders for at least two separate prescriptions. The advantages of a system which automatically fills the respective separate prescriptions, combines the prescriptions of each order and prepares the orders for mailing are readily apparent. An automated system would produce great labor savings in what heretofore has been a highly labor intensive process and at the same time would reduce time required to process prescriptions.

While the advantages of such a system are apparent, there are a number of problems which have to be solved in order to automatically fill and combine multiple prescription orders into a single package. The multiple parts of an order have to be brought automatically into close proximity at a packaging location. There is a need to place literature about the prescriptions in each shipping container along with the prescription. Any system which automatically distributes drugs must have a number of controls and checks to insure that the correct prescription is filled into the correct bottle which has been labeled correctly and the correct bottle is placed in the correct shipping container. Any deviation from the correct operations and handling of the prescription could be expected to have serious consequences. Lastly, in order to be economical for its intended purpose, the system must operate a high volume throughput.

SUMMARY OF THE INVENTION

In the system of the invention, a computer system called a Pharmacy Automation Computer (PAC) controls print, apply, and load stations (PAL stations), which print prescription labels, apply the labels to prescription bottles and load the labeled prescription bottles onto carriers, a carrier conveyer system which moves the carriers containing the prescription bottles from one station to the next, automatic drug dispensing machines which dispense pharmaceutical tablets or capsules into the labeled empty bottles in the carriers, bottle cappers which apply caps to the bottles, printers which print information corresponding to each prescription order, order consolidation and packing stations (OCP stations) which unload the bottles from the carriers and transport the bottles into shipping containers and which pack the printed information into the shipping containers along with the prescription bottles. The system dispenses both tablets and capsules and the word "pill" is used herein to refer to pharmaceuticals, both tablets or capsules, or any other kind of solid pharmaceutical dose in countable form. In accordance with the invention, PAC will receive the orders for prescriptions, each of which may contain an order for multiple prescriptions or a single prescription. The multiple prescriptions of an order may be for a single patient or two or more patients in a patient group, such as a family. PAC stores the information for each order and controls the PAL stations to print and apply labels to the bottles corresponding to each prescription. Bottle loaders at the PAL stations load the labeled bottles into assigned locations in carriers. The identification of the assigned locations for each order is stored by PAC. When the order is for two or more prescriptions to be automatically dispensed, these prescriptions will be normally assigned carriers progressing through the system simultaneously. In most instances, the several bottles of a given order will be placed in a common rank of carriers progressing synchronously through corresponding parts of the system in separate lanes.

Following loading of the bottles in the carrier, the conveyer system will transport the carriers with the labeled bottles to the automatic drug dispensing machines, where tablets or capsules of the prescriptions are automatically dispensed into the prescription bottles. Following this operation, the conveyer system transports the now filled bottles in the carriers to the bottle cappers where the prescription bottles are capped, whereupon the bottle carriers holding the now filled and capped prescription bottles are transported to the OCP stations.

The OCP stations are provided with bottle unloaders, each of which comprises a turntable designed to receive four bottle carriers simultaneously. The rank of carriers progressing synchronously through the lanes will all be received on the turntable of the same station. A robotic arm picks out the bottles from the carriers on the turntable corresponding to a given order and places them on a bottle conveyer, which carries the bottles to a loading mechanism. In the loading mechanism, the prescription bottles are bar code verified and then the bottles are loaded in a shipping container.

PAC also controls printers to print literature corresponding to each patient order. The printers print the information and enclose it in envelopes and place each envelope on a conveyer which transports the envelopes from the printers to the OCP stations. At each OCP station, the envelopes corresponding to the orders in the carriers on the turntable are received and are placed in a literature dispensing mechanism. Each envelope is inserted into a shipping container before the prescription bottles for the corresponding patient order are loaded into the shipping container. When the literature and the prescription bottles have been bar code verified and have been loaded into the shipping container with an envelope containing printed information, the shipping container is sealed and in most cases will be dropped onto a mail conveyer which carries the completed order to mailing where the packages are sorted by destination and sent to the patient.

DESCRIPTION OF A PREFERRED EMBODIMENT

The operation of the automated system of the invention is initiated by the entry of customer orders. From a customer order, a production order is generated, which upon being entered in the system is classified in accordance with a preestablished protocol. The production order will be classified as either a Manual-Dispense Production Order, an Auto-Pack Production Order, a Large Production Order, and/or a Marriage Production Order. The Manual-Dispense Order is one that is assigned to be manually filled and packed because of the nature of the prescription, such as because it is for a narcotic or a controlled substance, because it is for a compound, or because it is for a drug which is not in a solid dose countable form. The present invention is concerned with the automatically handled orders which include the Autopack Production Order, the Large Production Order and the Marriage Production Order. An Autopack Production Order is one containing one to four prescriptions for tablets or capsules, all of which are to be automatically dispensed and automatically assembled in a shipping container. A Large Production Order is like an Autopack Production Order except that it is for more than four prescriptions or requires more than four prescription bottles to be filled. In the specific described embodiment, only four prescription bottles can be automatically assembled in one shipping container. A Marriage Production Order is one in which some of the order must be manually filled and packed and some of which is to be automatically dispensed and packed.

Figure 1:
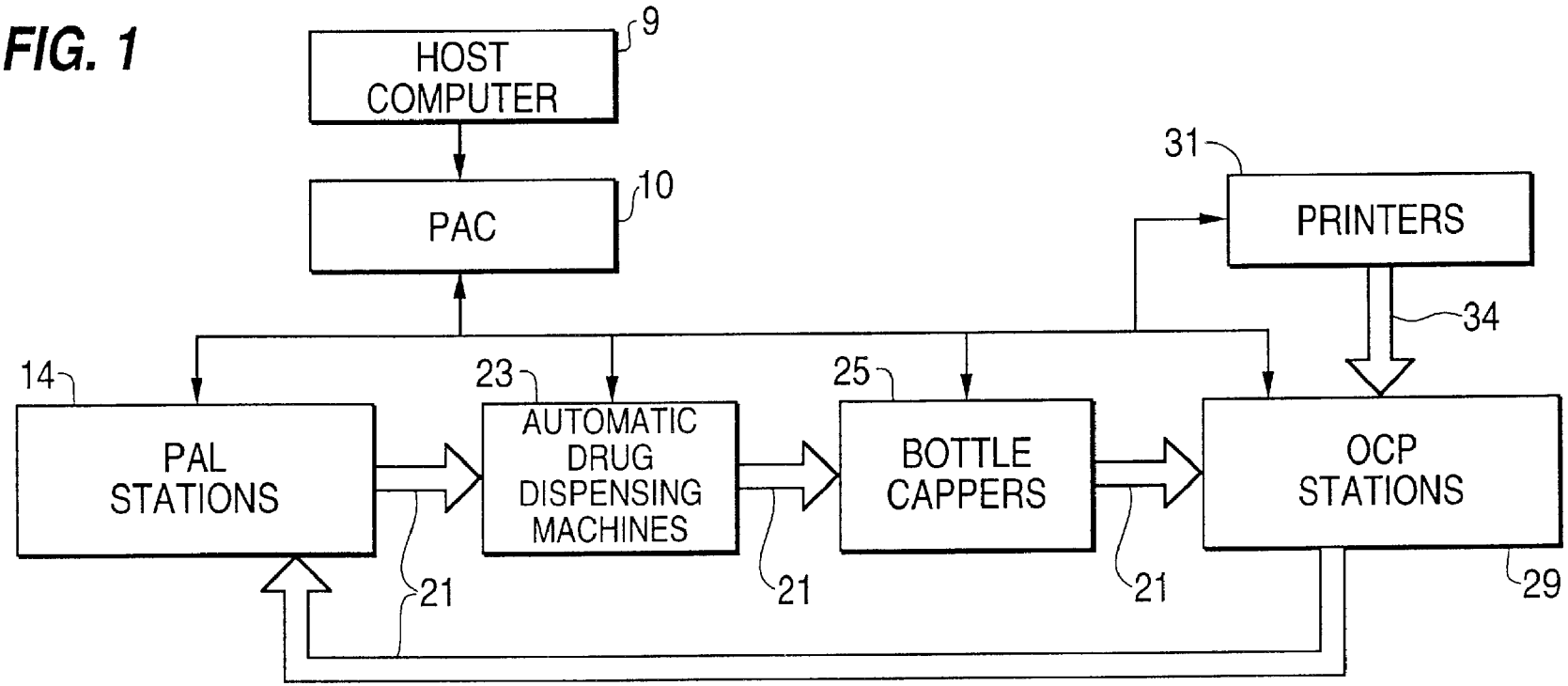
FIG. 1 is a block diagram illustrating the automated prescription filling, sorting and packaging system of the invention.

As shown in the schematic illustration of FIG. 1, the orders are received by a host computer 9 which forwards the orders to a distributed computer system including a central computer called Prescription Automation Controller 10 (PAC). PAC maintains an order file of the information about each prescription to be filled in an order including all of the information needed to fill each prescription, prepare a prescription label for each prescription and the information to print literature to go in a shipping container with the prescription or prescriptions. PAC updates the order file to maintain a record of the current status of each prescription being filled as it progresses through the automated system.

In the specific embodiment of the invention as shown in FIG. 1, PAC 10 controls a set of PAL stations 14 which print prescription bottle labels, apply the prescriptions to prescription bottles, and load the labeled bottles onto bottle carriers, a carrier conveyer system 21 which carries the bottle carriers to different parts of the system, automatic drug dispensing machines 23 which dispense tablets or capsules into the prescription bottles in the bottle carriers as they are carried by the conveyer system 21, bottle cappers 25 which apply caps to the bottles, and OCP stations 29 at which the bottles are unloaded from the carriers and placed in the shipping containers corresponding to the patient orders. The conveyer system 21 carries the bottles in the carriers from the PAL stations through the automatic drug dispensing machines 23 to the bottle cappers 25 and then from the bottle cappers to the OCP stations 29. The conveyer system 21 also carries the empty carriers back to the PAL stations 14. The OCP stations each also have a literature dispensing mechanism which inserts printed literature into each shipping container with the filled and capped prescription bottles. PAC 10 controls literature printers 31 which print literature for each prescription order and enclose the literature for each prescription order in an envelope, print a bar code that shows through a window in the envelope identifying the prescription order, and then place each envelope on a literature conveyer 34 which carries the envelope from the literature printers 31 to the OCP stations 29.

Figure 2:
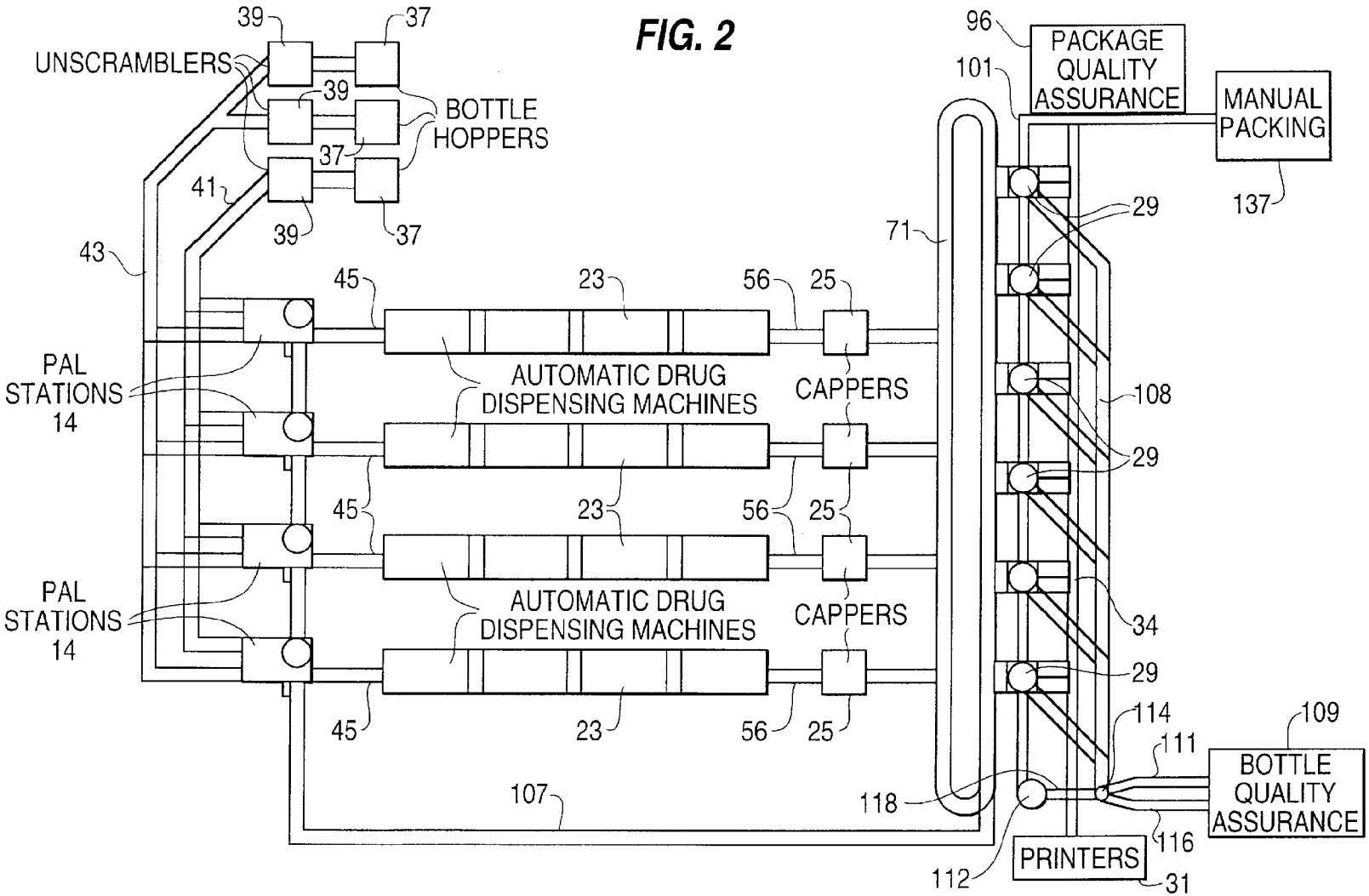
FIG. 2 schematically illustrates the electromechanical portion of the system of the invention in more detail.

As shown in FIG. 2, bottles to be automatically filled with the prescription drugs are introduced to the automated system by hoppers 37 which receive the bottles in bulk form and automatically feed the bottles to unscramblers 39. One of the hoppers 37 and one of the unscramblers 39 will be for large bottles of 160 cc. and the remaining hoppers and unscramblers will be for small bottles of 110 cc. The small bottle size can accommodate a majority of the automatically filled prescriptions. The large bottles are large enough for 91 percent of the prescriptions and are used to fill the prescriptions in that 91 percent which are too large for the small bottles. The remaining 9 percent of the prescriptions which are too large for the large bottles are filled by using multiple bottles. A large bottle and a small bottle will contain a volume required for 97.5 percent of the automatically filled prescriptions. In the unscramblers, the bottles are singulated and oriented so that the bottle opening first faces downward. The bottles are then righted and directed to PAL stations 14 on bottle conveyers 41 and 43, one for large bottles and one for small bottles. The unscramblers are purchased equipment and are available from Palace Packaging Equipment Co.

Figure 3:
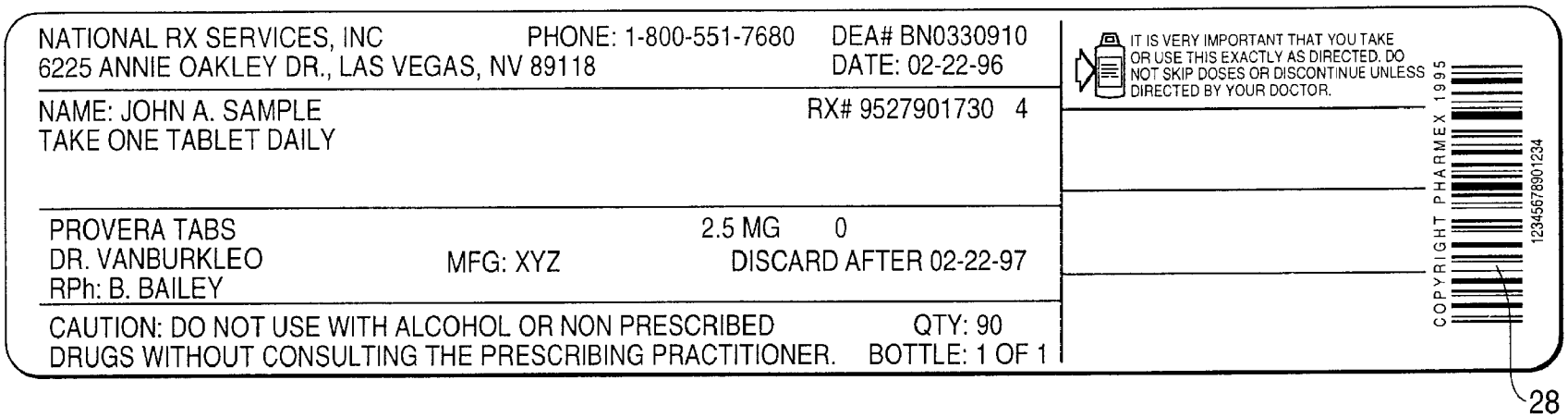
FIG. 3 illustrates a typical bottle label to go on a prescription bottle to be processed by the system of the invention.

In the specific embodiment of the invention, there are four PAL stations 14 as shown in FIG. 2. At the PAL stations 14, prescription labels are printed under control of the PAC corresponding to the prescriptions being automatically filled and the printed labels are applied to the bottles. As shown in FIG. 3, which illustrates a typical bottle label, the bottle label contains the usual prescription information plus a bar code 28 representing a 14 digit decimal number called the Bottle Identification Number (BIN). The first ten digits of the BIN will the same as the order number which uniquely identifies a patient order. The other four digits of the BIN represent a prescription item number within the patient order. This BIN will also be stored by the PAC 10 in the order file.

Figure 4A:
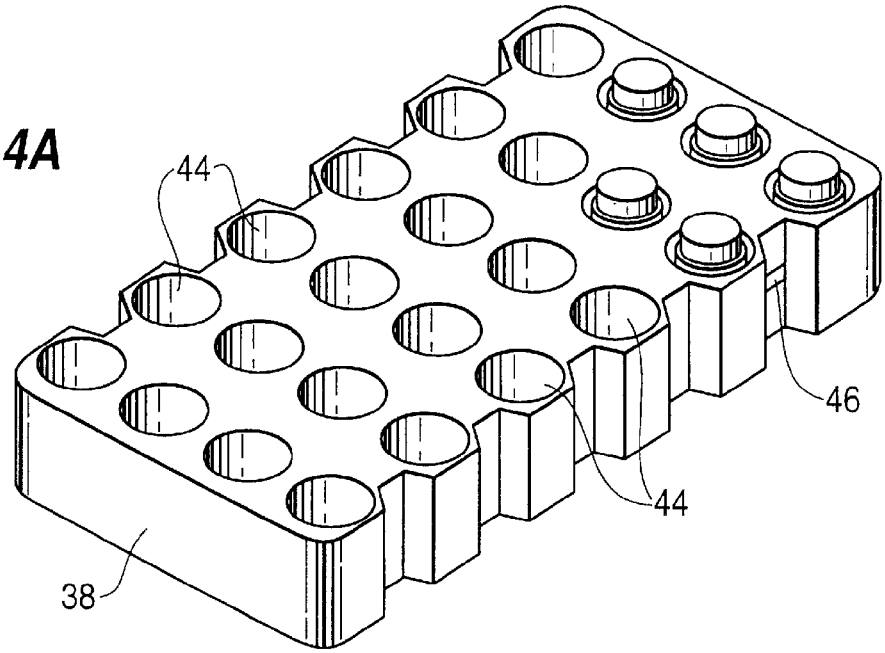
FIGS. 4a and 4b show perspective and partial sectional views of a prescription bottle carrier employed in the system of the invention.
Figure 4B:
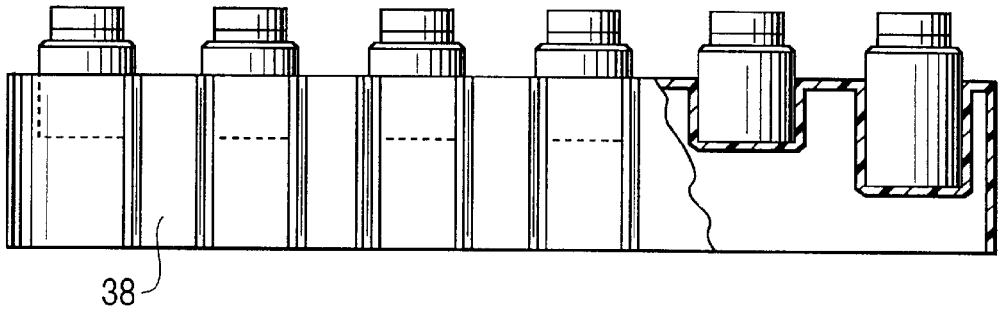

As shown in FIGS. 4a and 4b, a bottle carrier has 24 wells 44 to receive bottles which are arranged in a 4×6 array. The leading row which consists of four wells are sized to accommodate the large sized bottles and the remaining five rows are sized to receive the small bottles. This breakdown is a close approximation to the anticipated requirements for large and small bottles. The bottles all have the same diameter, as do the wells, but the wells in the first four rows are deeper to accommodate the larger bottles which have a greater axial dimension. The well bottoms in the carriers are positioned so that the tops of the bottles loaded in the carriers are all at the same level.

The bottle carrier is also provided with an RFID tag 46 which uniquely identifies the carrier. The carrier identification can be read out from the RFID tag by radio frequency transducers. The RFID tags and transducers are available from Data Logic Company. After a carrier is loaded at a PAL station, the RFID tag on the carrier is read and stored by PAC 10 in the order file associated with the prescription orders of bottles loaded on the carrier.

Each bottle becomes unique when the label is applied to the bottle, and it must be placed at a predetermined scheduled position within the bottle carrier by a PAL station 14. It is critical that no deviation occur between the logical position of the bottle determined by PAC and the physical location of the bottle on the carrier. Also a given Auto-Pack Production order for more than one prescription may have prescription bottles in up to four different carriers, but the carriers will usually all be in the same rank in their progression through the system so that they will be loaded at approximately the same time by the PAL stations. PAC must maintain in the order file the identification of the carrier in which the bottle of each prescription is located, and the location in the carrier where each bottle is located. PAC will obtain the carrier identification after the carrier is loaded by the reading of the carrier RFID tag when the carrier is positioned for transfer out of the PAL station.

PAL Station

Figure 5A:
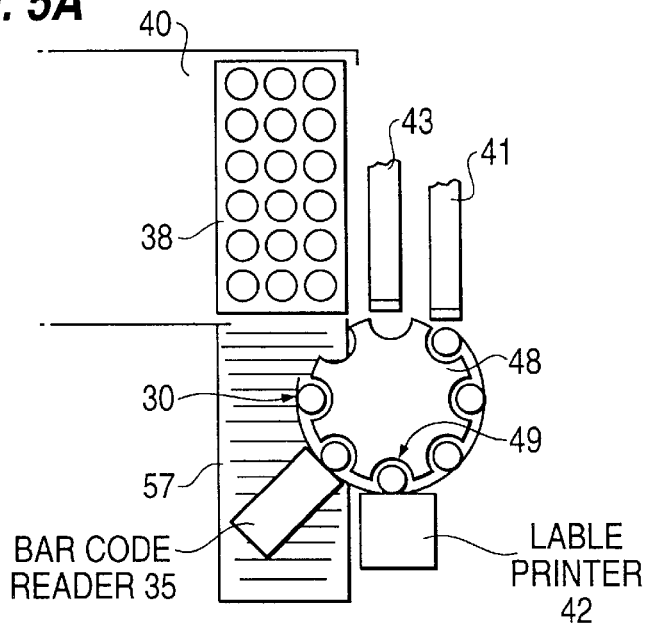
FIGS. 5a and 5b schematically illustrate plan and elevational views of a PAL station used in the system to print and apply labels to the prescription bottles and load the bottles into the carriers.
Figure 5B:
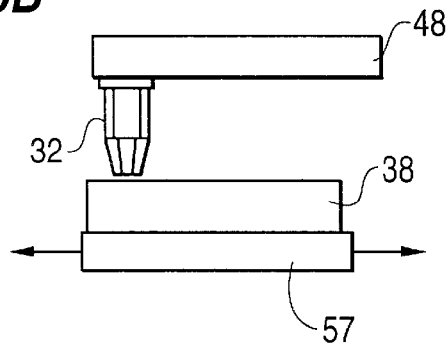

As shown in FIG. 5a, the empty bottles are fed to a PAL station on bottle stream conveyers 41 and 43. At the PAL station, the bottles are received in a star wheel 48 which transports the bottles in sequence to a label applying position 49. At the label applying position, a label printed by a label printer 42 is applied to the prescription bottle by rotating the bottle on its axis at the position 49. After application of the label, the bar code on the label is read by bar code reader 35 and is received by the PAL station controller to verify the BIN on the label. After verification of the bar code, the star wheel advances the labeled bottle to the drop position 30. As shown in FIG. 5b, the bottle is dropped through a trap door from the drop position into a telescoping guide 32, which guides the bottle into a carrier 38 positioned beneath the star wheel 48. Empty carriers are delivered to the PAL station by a conveyer, from which they are received into a carrier buffer 40, and then are loaded on an XY indexing table 57 positioned beneath the star wheel 48. The indexing table 57 is moved in a serpentine path to move each well in the carrier on the table 57 in sequence under the drop position 30 to receive a prescription bottle through the guide 32. As each prescription bottle is dropped from the drop position 30, the guide 32 telescopes downwardly to guide the bottle into the appropriate carrier well positioned directly under the drop position. In this manner, the carrier is loaded with labeled prescription bottles in scheduled positions in the carrier.

After the loading cycle, an RFID tag reader will read the unique RFID tag identification and communicate it to PAC. The carrier will then be released by the PAL station onto a conveyer 45 which carries the carrier loaded with the labeled empty prescription bottles to an automatic dispensing machine 23, of which there are four, one for each PAL station 14.

Automatic Drug Dispensing Machines

As shown in FIG. 2, the conveyers 45, under control by PAC, carry the bottle carriers from the four PAL stations 14 to carrier buffers at the entrances of the four automatic drug dispensing machines 23 in which the tablets or capsules of the prescriptions are automatically dispensed into the prescription bottles under the control of PAC. Because of the organization provided by the carriers, the bottles are arranged into four columns approaching each automatic dispensing machine 23. Since there are four automatic dispensing machines 23, 16 parallel prescription bottle columns approach the dispensing machines. In the specific embodiment of the invention, the four automatic drug dispensing machines each have 384 drug dispensers arranged four columns wide and 96 rows deep to provide a total of 1,536 pill dispensers. The automatic drug dispensing machines are similar to those described in the copending application Ser. No. 08/455,398 filed May 31, 1995 which is hereby incorporated by reference. Each dispensing lane is divided into 32 buffer assemblies each containing twelve drug dispensers oriented six on each side of a conveyer within the dispensing machine.

Figure 6A:
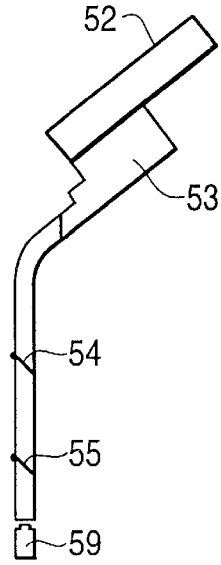
FIG. 6a schematically illustrates one of the drug dispensers in a dispensing machine.
Figure 6:
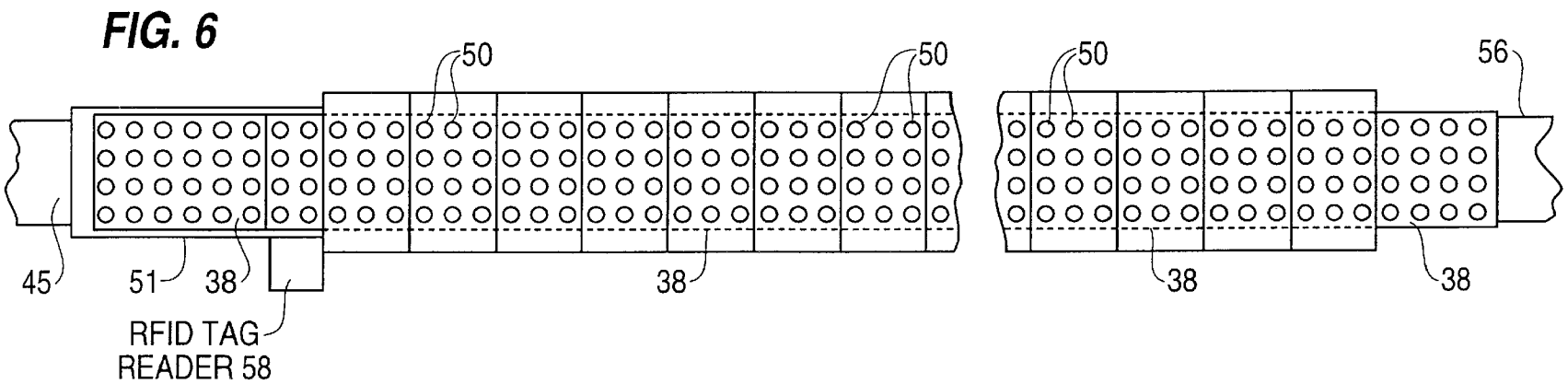
FIG. 6 schematically illustrates a drug dispensing machine employed in the system of the invention.

As shown in FIG. 6, which schematically illustrates one of the dispensing machines with bottle carriers 38 being indexed there-through, each of the 32 buffer assemblies of the machine contains three rows of dispensers 50. The carrier conveyer in each dispensing machine is an indexing conveyer, which moves each carrier in the dispensing machine forward one row at a time. The carriers in a dispensing machine are juxtaposed head to toe in a continuous line throughout the dispensing machine so that there are no gaps between carriers and the indexing conveyer moves all the carriers in the continuous line forward simultaneously one row at a time. The carriers in the continuous line are spaced from each other a fraction of an inch on the indexing conveyer, but the distance between the last row on a preceding carrier in the continuous line and the first row on a succeeding carrier is equal to the distance between rows on a carrier and to the distance between dispenser rows in the automatic dispensing machines 23. At each position in which the carriers are stopped in the automatic dispensing machine, the prescription bottles in the carriers will be aligned under the drug dispensers. Accordingly, each row of bottles is successively brought under each of the 96 rows of four dispensers in the machine. Each time the bottle carriers containing the prescription bottles are stopped in the machine, each of the bottles in the line which is underneath a drug dispenser containing tablets or capsules to be dispensed in such bottle is filled with the prescribed number of tablets or capsules and then the continuous line of carriers is indexed to the next row position. When a conveyer 45 transports a carrier newly filled with empty prescription bottles to a dispensing machine 23, the carrier will come into position adjacent the preceding carrier at the entrance to the dispensing machine in a carrier buffer 51. An RFID tag reader 58 verifies the presence of the correct new carrier in the buffer 51. The indexing conveyer will not index the line of juxtaposed carriers in the dispensing machine forward unless a new carrier with empty bottles is within the carrier buffer 51 so that no gaps will be formed between the carriers in the dispensing machine. When the new carrier reaches the indexing conveyer, it will become a part of the line of juxtaposed carriers in the dispensing machine being indexed forward one row at a time. Each of the automatic drug dispensing machines 23 operates to fill prescriptions in the above-described manner as the bottle carriers containing the prescription bottles move through the machines. Preferably, the buffer assemblies of each dispensing machine 23 are divided into groups of eight separated by a selected number of dispensing rows so that the indexing conveyer can be accessed and technicians on opposite sides of a dispensing machine can more readily communicate. When a carrier moves out of the last row position in a dispensing machine, all of the prescription bottles in that bottle carrier should be filled and a conveyer 56 transports the prescription bottles now filled with the prescriptions to a bottle capper 25 as shown in FIG. 2.

The individual drug dispensers and their organization into buffer assemblies is similar to that described in the above-mentioned copending application. As described in this application, and as shown in schematically in FIG. 6a, the tablets or capsules are counted out one at a time from a hopper 52 by a counter 53 into an upper buffer 54, then released into a lower buffer 55 and then released from the lower buffer into a prescription bottle (designated 59 in FIG. 6a) when it comes into position under the dispenser. The releasing of the tablets or capsules from the upper buffer 54 into the lower buffer 55 is referred to as "staging". While the tablets or capsules of a first prescription are held in the lower buffer 55 waiting to be released into a prescription bottle, the tablets or capsules of the next prescription to be filled from that dispenser after the first prescription will be counted into the upper buffer 54 as described in the above-mentioned copending application. To control the release of tablets or capsules from an individual dispenser into the correct prescription bottle, PAC maintains an index count for each automatic dispensing machine 23 which is incremented each time the automatic drug dispensing machine indexes the carriers one row forward within the machine. PAC 10 maintains a prescription work-to list for each drug dispenser and this list is loaded with index numbers each corresponding to a prescription for the tablets or capsules of the dispenser and indicating when the dispensing cell is to dispense the tablets or capsules of the prescription. The index number for a prescription is loaded into the work-to list at the time the prescription bottle for the prescription is loaded into a carrier. The index number is determined from the current index count plus the number of carrier rows between the dispenser and the carrier row into which the prescription bottle is loaded. When the index count for the dispenser reaches the index number in the work-to list for a dispenser, the tablets or capsules from the lower buffer in the dispenser are released into the prescription bottle.

Because more than one bottle may be approaching a drug dispenser to be filled from that dispenser, each work-to list may contain several index numbers one for each of the prescription bottles to be filled from the dispenser loaded in a carrier approaching the dispenser. The lowest index number is processed first in each work-to list so that each successive bottle will receive the corresponding counted out prescription by the dispenser. If a drug dispenser in the dispensing machine senses that the dispenser may have failed to count out the correct number of tablets or capsules or fails to operate to release the tablets or capsules into the intended prescription bottle, this failure would be reported to the PAC 10 which will record the failure in the order file. The faulty dispenser is taken out of service by the PAC 10, which schedules no new prescriptions for that dispenser until it has been serviced and rendered operative.

Prescription Bottle Cappers

After the prescription bottles in the carrier have been filled by one of the automatic drug dispensing machines 23, a conveyer 56 transports the carrier to a bottle capper 25 where the bottles capped while the bottles remain in the carrier. At the bottle capper 25, the carrier is loaded on an XY indexing table and the carrier is moved on the indexing table to position each bottle under the bottle capper where the bottle is capped. If the bottle capper detects that a bottle is not properly capped, this information is communicated to PAC and entered in the order file.

OCP Stations

As explained above, the carriers are organized into ranks with a rank of four carriers progressing through the automatic drug dispensing machines 23 and the bottle cappers 25 synchronously so that the four carriers of a rank exit from the cappers 25 at the same time. From the bottle cappers 25, the conveyers 56 feed the carriers onto an endless conveyer loop 71 which will transport the four carriers of a rank to one of six OCP stations 29.

Figure 7:
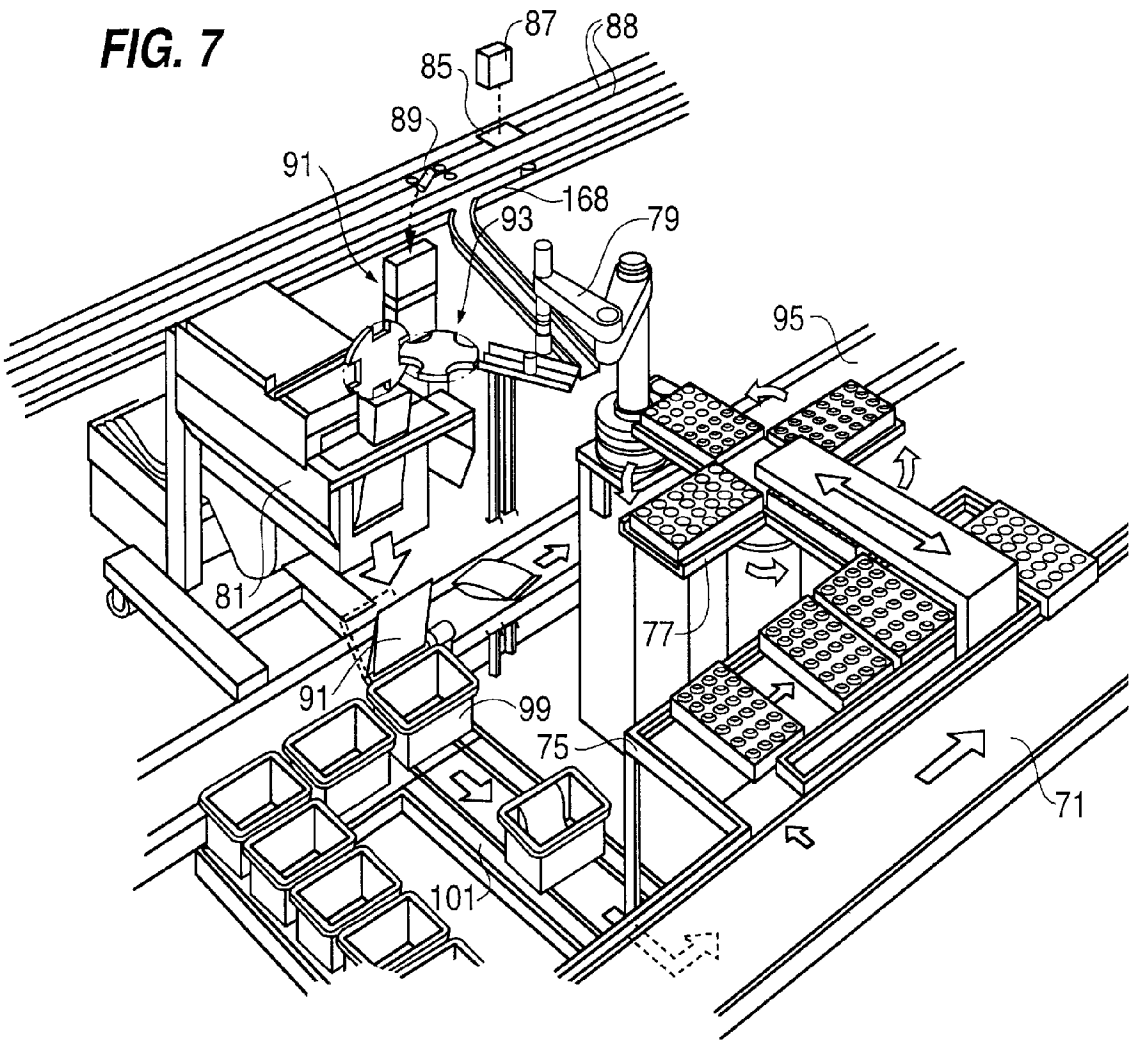
FIG. 7 is a perspective view of an OCP station for unloading prescription bottles from carriers and packing the prescription bottles with printed literature in shipping containers.

As shown in the OCP station of FIG. 7, the four carriers of a rank are first received in a carrier buffer 75 from which they are loaded onto a turntable 77. An RFID tag reader verifies that the correct carriers are in place on the turntable. The turntable 77 selectively rotates the carriers into a position to have the bottles removed by a robotic arm 79. The OCP station also contains equipment 91 for packing literature into shipping containers, which take the form of bags, along with the prescription bottles of a given order. The OCP station also includes a bagging machine 81 which presents the bags for successive orders to be loaded in sequence at a loading position. The bagging machines are purchased equipment manufactured by Concept Packaging Company of Carson City, Nev. The bagging machine also prints a bar code identifying the order directly on each bag. The printed data may include the mailing address to which the shipping container is to be sent. In FIG. 7, a bag 83 is shown at the loading position with its mouth open. The opening of the mouth of bag 83 is accomplished by a blower provided as part of the bagging machine. The conveyer 34 brings envelopes 85 containing literature to be packed in shipping containers to the OCP station in the reverse sequence that the patient orders are to be packed at that OCP station for a given rank of carriers. At the OCP stations the literature conveyor 34 is in the form of a literature sortation system of the type used in mail sortation by the U.S. Post Office. The literature sortation system comprises a pair of belts 88 at each OCP station and the pairs of belts pass the envelopes along from station to station. Between each pair of belts is a gap in which a deflector 89 is located. The deflector 89 under control of the OCP station controller can deflect selected literature envelopes into a literature dispensing mechanism 91 at the OCP station. When a rank of carriers is directed to a given OCP station by PAC 10 from bottle cappers 25, PAC 10 will send an unload message to the controller for the OCP station. The unload message will contain an indication of the sequence that the orders are to be unloaded from the rank of carriers at the station as well as containing the information as to the scheduled position of the bottles of each order in the four carriers of the rank of carriers to be unloaded. At the same time that PAC sends an unload message to the controller of the OCP station, it sends a corresponding autopublish message to the printers 31. This message will contain the information to be printed for the complete orders contained in the rank of carriers being sent to an OCP station. The autopublish message will also contain the sequence in which the corresponding orders are to be unloaded at the OCP station. In response to the autopublish message, one of the printers 31 will print literature for the orders and deposit the literature packs for the orders on literature conveyer 34 in reverse order from that in which the orders are to be unloaded at the OCP station. Each literature pack is enclosed in an envelope having a die cut window through which a bar code is readable by a bar code reader. This bar code which will be printed by the appropriate printer 31 will identify the order for which the literature pack is printed. As the envelopes containing literature packs are carried past the OCP station in the literature sortation system, the bar code readable through the window in each envelope will be read by a bar code reader 87. When the bar code read by the bar code reader verifies that the bar code coincides with an order in the unload message received by the controller for the OCP station, the controller for the OCP station will cause the deflector 89 to deflect the envelope into the literature dispensing mechanism 91 at the OCP station. Since the conveyor brings the literature envelopes to the station in the reverse sequence that the corresponding patient order is to be packed at the packing station, the envelopes will be packed into the dispensing mechanism in that sequence. When a bag 83 is ready to be packed at the OCP station, the literature dispensing mechanism 91 first inserts a literature envelope into the bag 83 where it will be positioned at one side of the bag by gravity. This effect is achieved by orienting the bag at a slight tilted position at the bagging machine. After the literature has been inserted, the robotic arm 79 unloads the bottles of the order from the scheduled positions in the four carriers on the turntable in accordance with the unload message. The robotic arm includes a bar code reader and each time a bottle is lifted out of a carrier by the robotic arm, the label on the bottle is read and verified. The prescription bottles are then loaded into the bag 83 by a bottle loading mechanism 93.

Figure 7A:
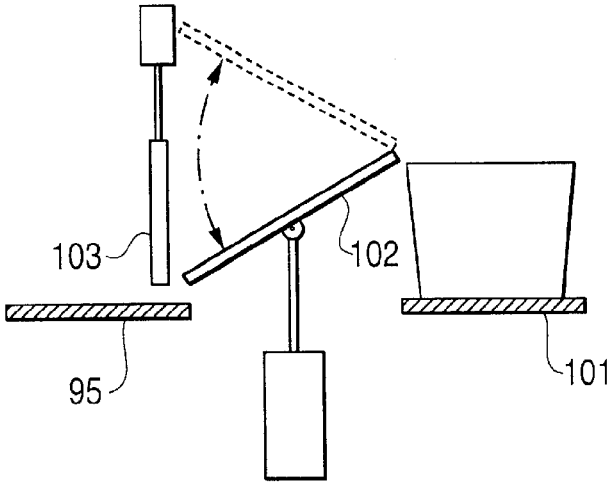
FIGS. 7a-7d illustrate subsystems of an OCP station.

If, because of a malfunction, a literature envelope is not deflected by the deflector 89, because of, for example, an improper bar code on the envelope, the envelope will continue on the conveyer 34 to the end of the conveyer and be dumped into a receptacle at the package quality assurance station 96 as will be described in more detail below. In this circumstance, the bottles of this order will not be packed with a literature pack. When the shipping containers 83 have been verified and filled with a literature pack and with a patient's order, the bag is sealed and dropped onto a conveyer 95 which carries the sealed shipping container to a mailing area where the bag is read and logged and then mailed to the customer. If the bag does not contain a literature pack, then the bag is diverted into a tote 99 which will then be transported by a conveyer 101 to the package quality assurance station 96 where the shipping container will be assembled with the literature pack manually. As shown in FIG. 7a, the bag is dropped from the loading position onto an inclined table 102 and normally slides under a gate 103 onto conveyer 95. If the bag is to be sent to the package quality assurance station 96, the gate 103 will be down to prevent the bag from sliding onto conveyer 95 and the table 102 is pivoted to dump the bag into a waiting tote on conveyer 101.

Figure 7D:
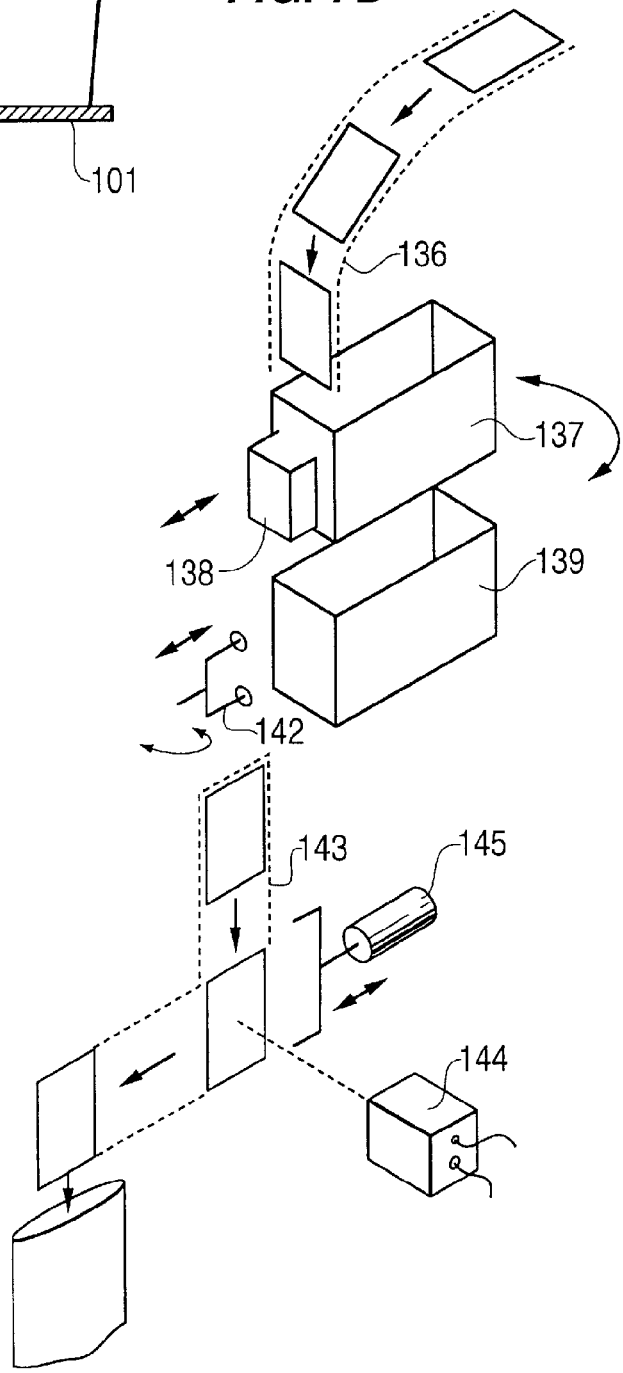
Figure 7C:
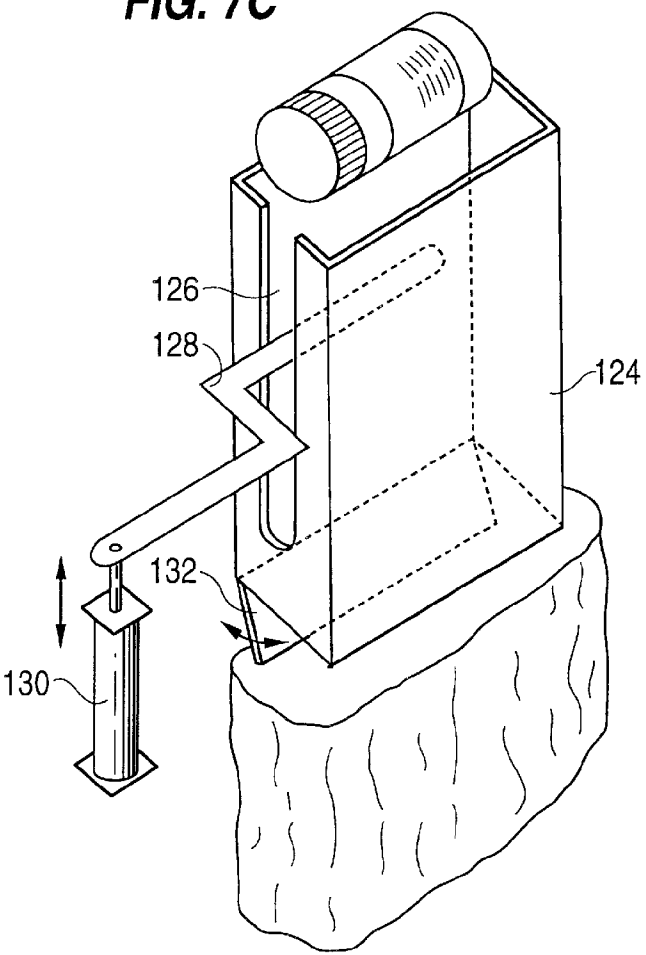
Figure 7B:
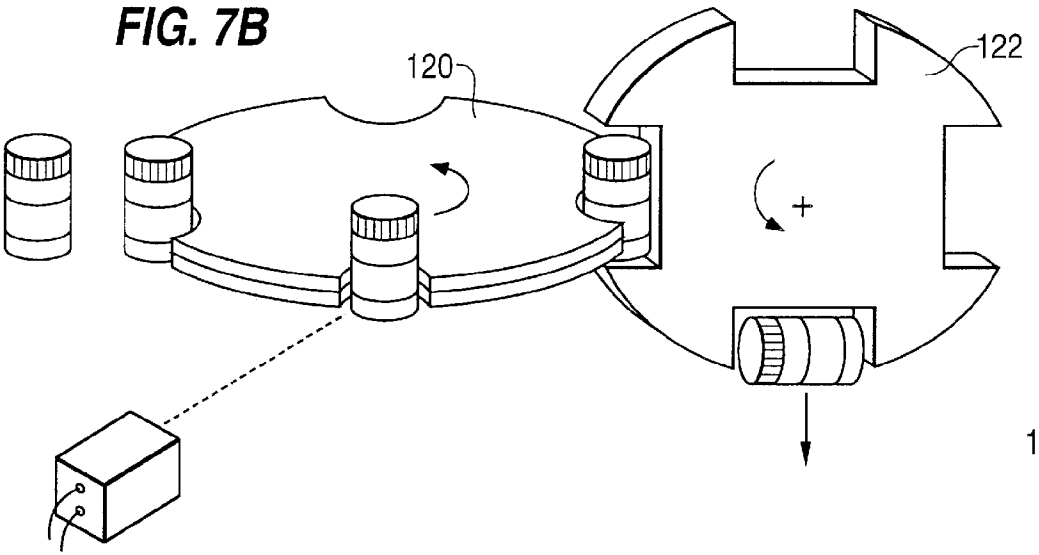

As shown in FIG. 7b, the bag loading mechanism comprises a horizontal star wheel 120 which receives the bottles from a bottle stream conveyer. Bottles are placed on the bottle stream conveyer by the robotic arm 79. The horizontal star wheel feeds the bottles into a vertical star wheel 122 which rotates the bottles from a vertical axis orientation to a horizontal axis orientation and drops the bottles into a bottle nozzle device 124, as shown in FIG. 7c. A bar code reader 106 reads the bar code on each bottle as it is carried by the star wheel 120. The bottle nozzle device 124 receives all the bottles of the order and then deposits the bottles in the waiting open bag.

As shown in FIG. 7c, the bottle drops from the vertical star wheel 122 into the open top of the box shaped nozzle device 124. One vertical side of the nozzle device 124 has a slot 126 into which a movable arm 128 extends. When the first bottle of an order is received into the nozzle device 124, the arm 128 will be relatively close to the open top of the nozzle device 124. The arm 128 is movable upwardly and downwardly by means of the actuator 130 and as each successive bottle is received in the nozzle device, the arm 128 indexes downwardly. When all of the bottles of an order have been received in the nozzle device 124, the actuator 130 lowers the arm 128 to the bottom of the slot 126 and then withdraws the arm 128 from the nozzle device 124 so that the bottles drop to the bottom of the nozzle device. The nozzle device then moves downwardly into the open bag. The bottom of the nozzle device 124 is provided with a normally closed flap 132 and the flap 132 is opened after the nozzle device lowers into the bag to allow the bottles to drop to the bottom of the bag.

The operation of the literature dispensing mechanism 91 is schematically illustrated in FIG. 7d. As shown in FIG. 7d, envelopes deflected from the conveyor 34 travel through a chute 136 to one side of a magazine 137 and a pusher mechanism 138 pushes the envelope sideways into the magazine. The magazine 137 is one of a pair of magazines 137 and 139 positioned one above the other. When all of the envelopes for a rank of carriers on the turntable have been received in the upper magazine 137, the assembly of the two magazines is rotated to 180 degrees so that upper magazine becomes the lower magazine and vice versa. A vacuum pick-up 142 removes the envelopes from the lower magazine and carries the envelopes to a guide 143, which directs each envelope to a bar code read position. After a bar code reader 144 reads the bar code on the envelopes, an actuator 145 moves the envelope into position over a waiting open bag, where the envelope is dropped into the bag.

While the lower magazine of the pair of magazines 137 and 139 is being unloaded and packed in a bag from the lower position as shown in FIG. 7c, the magazine in the upper position will be packed with literature envelopes for the next rank of carriers to be received by the OCP station.

As described above, the bar code on the bottles transported by the horizonal star wheel 120 are read by a bar code reader 106. The patient order represented by the bar code read by the bar code reader 106 must agree with the bar code read from the literature pack by bar code reader 144 and with the bar code printed on the shipping container by the bagging machine 81. If there is any discrepancy, the package will be directed into the waiting tote 99 and sent on conveyer 101 to the package quality assurance area 96 where the shipping container and its contents will be manually inspected for resolution of any problem identified.

The above-described operation of the packing of the shipping containers with a literature pack and the bottles of the patient order is carried out for an order comprising a single bottle or containing multiple bottles up to four bottles of an order if the bottles of the patient order are all in the same rank of carriers which will be positioned on the turntable 77. In some instances a patient order will have one or more bottles in two different ranks of carriers. In that instance, this fact will be recorded in the order file by PAC 10 and PAC 10 will direct the robotic arm to place the bottles of the split order on a bottle stream conveyer 108 from which they are sent to bottle sortation and packing station 112 (BSP station) to be described below.

As described above, each bottle unloaded from a carrier at one of the OCP stations has its bar code read and verified by a bar code reader in the robotic arm 79. A discrepancy in this verification will cause OCP station to place the bottle in a bottle stream conveyer 108 to be sent to the bottle quality assurance area 109 where the bottle is manually and electronically inspected. Any bottle which has been identified by PAC as one which may have not been filled with the correct number of tablets or capsules by the automatic dispensing machine is also sent via conveyer 108 to the bottle quality assurance area 109. Also when a bottle capper 25 detects that it failed to properly cap the bottle, this failure will be recorded in the order file and PAC 10 will direct the OCP station to place the corresponding prescription bottle in the bottle stream conveyer 108, which transports the bottle to the bottle quality assurance area 109.

In addition, bottles which require verification that the replenishment of the automated dispensers in the automatic dispensing machines 23 has been accomplished with the correct drug are also sent to the bottle quality assurance area. This latter function is accomplished as follows: PAC 10 maintains a count of the number of tablets or capsules to be dispensed from each drug dispenser in the automatic drug dispensing machines 23. When the number of tablets or capsules in the hopper of a dispenser reaches a predetermined low level, a prescription for the tablets or capsules of that dispenser is selected from the que of prescriptions awaiting filling stored in PAC 10. The prescription is selected to call for a sufficient quantity of tablets or capsules to exhaust the remaining tablets or capsules in that dispenser. The corresponding dispenser is then caused to dispense tablets or capsules in accordance with the predetermined prescription so that the hopper at the dispenser is exhausted of tablets or capsules. This operation is carried out before the PAL station 14 labels a bottle for this corresponding prescription. The tablets or capsules for the prescription will be counted out into the upper buffer of the corresponding dispenser but will not be released from the upper buffer to the lower buffer because the number of tablets or capsules counted out is incomplete. Then when that drug dispenser has been refilled with tablets or capsules, the dispenser will then complete its counting out of the number of tablets or capsules required for the prescription into the upper buffer. When the count is successfully completed, the prescription bottle for this prescription will be labeled and loaded in a carrier by the appropriate PAL station in the appropriate column of the carrier. When this bottle reaches the dispenser, the tablets or capsules will be released into the bottle. Such a bottle which is filled in this manner with part of the tablets or capsules before the dispenser is exhausted and part of the tablets or capsules coming from the next refill of the dispenser is called a crossover bottle. All crossover bottles upon being unloaded at an OCP station 29 are placed in the bottle stream conveyer 108 by the robotic arm 79 to send the crossover bottles to the bottle quality assurance area 109.

In addition to the crossover bottles, the first bottle after the crossover bottle to be filled by any dispenser is also sent to the bottle quality assurance area 109 by being placed in the bottle stream conveyer 108 by the OCP station. When a bottle requiring inspection at the bottle quality assurance area is part of a multiple bottle order, all of the remaining bottles of that order are sent via the conveyer 119 to BSP station 112.

Bottle Quality Assurance Area

The bottle quality assurance area 109 has several stations at which pharmacists will scan the bar code on the bottles and visually inspect the contents of the bottles. The scan of the bottle bar code will bring up a display on the pharmacist's terminal which includes all the information regarding the particular prescription and order including the drug name, and instructions which identify the reason for the verification. All of the bottles that pass this inspection are inserted by the pharmacist on a bottle stream conveyer 111 to send the inspected bottles to the BSP station 112.

As described above, the robotic arms at the order consolidation and packing stations place individual bottles in the bottle stream conveyer 108 to be sent to BSP station 112 or to the bottle quality assurance area 109. The conveyer 108 leads to a star wheel diverter mechanism 114 which under the control of a controller for the BSP station deposits the bottle in a bottle stream conveyer 116 leading to the bottle quality assurance area 109 or into a bottle stream conveyer 118 leading to BSP station 112.

BSP Station

Figure 8:
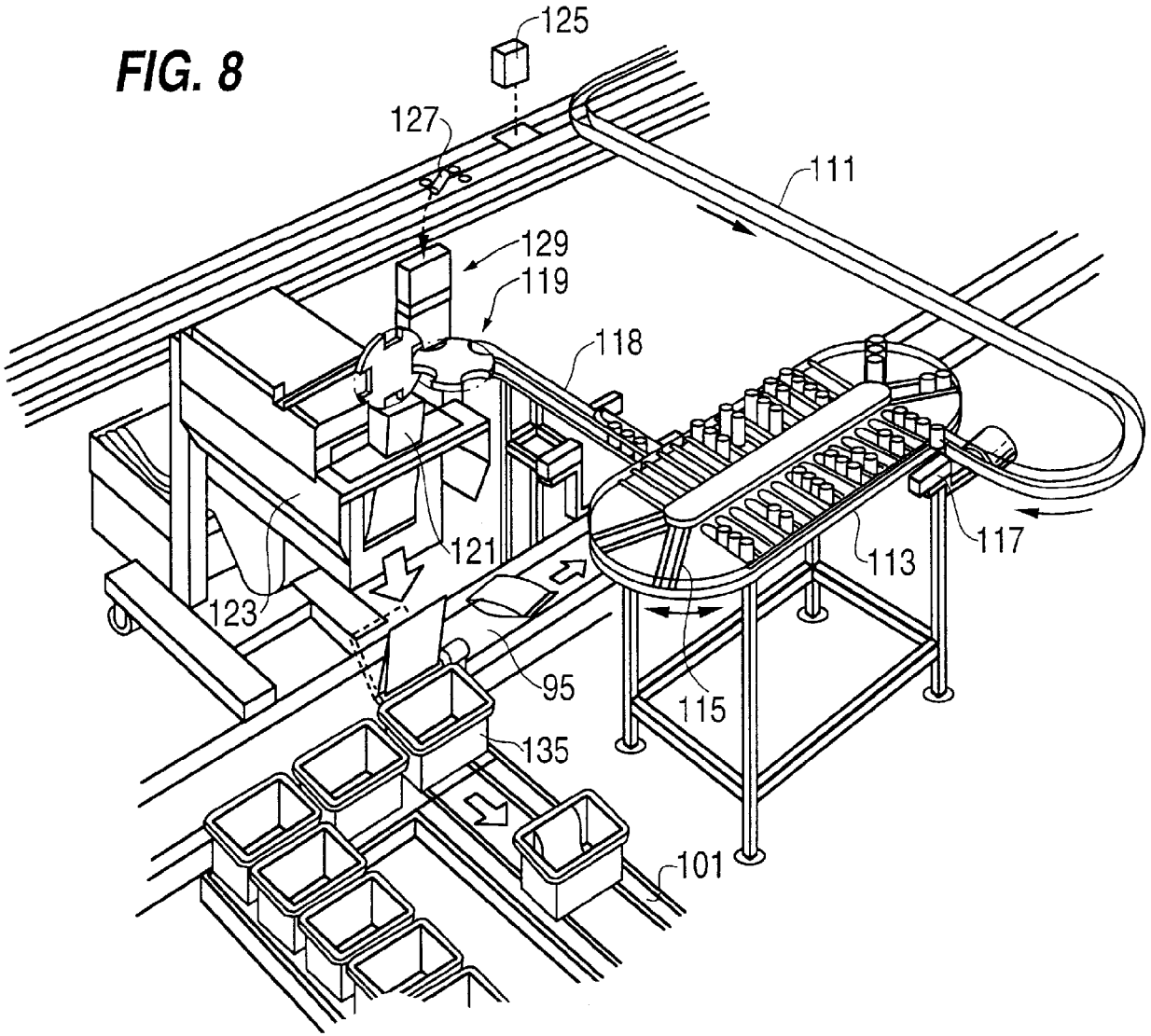
FIG. 8 is a perspective view of an OCP station, bottle sortation and packing station employed in the system of the invention.

As shown in FIG. 8, the BSP station comprises a rotary buffer 113 in which slots 115 are defined by carriers sliding on an oval table top and rotate around a central hub on the table top. The bottle stream conveyer 118 leads to the table top of the rotary buffer 113 and each of the slots 115 rotates in succession past the exit end of the bottle stream conveyer 118. As the bottles approach the buffer 113, the bar codes on the labels are read by a bar code reader 117,. The controller for the BSP station controls the buffer 113 to receive the bottles presented on conveyer 118 in slots corresponding to patient orders as determined from the BIN numbers read on the prescription bottles. The prescription bottles of a given order are all accumulated in the same slot 115 in the rotary buffer 113. When a complete order has been accumulated in the rotary buffer 113, PAC will direct the printers 31 to print a literature pack for the order. Literature on the conveyer 34 passes the BSP station 112 before the OCP stations and the bar codes on the literature packs on the conveyer 34 are read by a bar code reader 125 at the BSP station. The conveyor 34 at the BSP station 112 comprises a literature sorting conveyor like those at the OCP stations. When a literature envelope containing literature for a patient order which is scheduled to be packaged at the BSP station passes by this station, this fact will be detected by the bar code reader 125. In response to this detection, a deflector 127 will deflect the literature from the conveyer 34 and direct it into literature dispensing mechanism 129. The literature dispensing 129 is the same as the dispensing mechanisms 91 at the OCP stations 29. The BSP station 112 also has a bagging machine 123 like the bagging machines 81 at the OCP stations 27 and the literature will be dispensed and packed in a bag 121 in the same manner as described in connection with the OCP stations. When the literature dispensing mechanism 129 feeds a literature pack to the shipping container, the bar code of the literature pack will be read by a bar code reader. This bar code should identify an order in a slot in the rotary buffer 113. In response to the bar code read by the bar code reader, the controller for the BSP station will operate the rotary buffer 113 to move the corresponding buffer slot 115 into position to be unloaded into bottle loading mechanism 119, which is of the same construction as the bottle loading mechanisms 93 at the OCP stations. Then after the literature pack has been inserted into the waiting bag 121, the bottles of the order will be loaded into the bag 121 by the mechanism 119. The BSP station, like the OCP stations, drops the completed and sealed bags on the conveyer 95 for carrying the completed package to the mailing area. When the bar code reader 131 detects that the envelope does not correspond to an order in the buffer 113, then this envelope will be packed without bottles and the bag will be diverted into a tote 135 which will be carried by the conveyer 101 to the package quality assurance area 96 where the package will be manually assembled with the correct prescription bottles.

If the literature pack is on the conveyer 34, but because of failure of the bar code reader 125 or the literature sorting mechanism, does not get diverted at station 112, the conveyer 34 will carry the literature package to the package quality assurance area where it can be manually added to the package.

Manual Packing Area

When the order is a marriage order requiring some of the order to be manually filled and some of the order to be automatically filled, a portion of the order to be automatically filled will be filled by the automatic dispensing machines 23 capped by the bottle cappers 25 and inserted into a bag or shipping container at an OCP station 29 along with the literature of this order. This bag will then be diverted into a waiting tote 99 and sent on the conveyer 101 to manual packing area 149 where the rest of the marriage order requiring manual dispensing and packing will be packed with the automatically dispensed portion of the order.

When the order is a large production order requiring more than four bottles for the order, all items of the large production order should be found in the same rank of carriers and loaded onto a turntable at an OCP station. Four bottles of the order will automatically be inserted into a shipping container as described above along with the literature for the order and then this order upon being bagged will be diverted into a waiting tote 99 which will remain at the OCP station to receive the rest of the order. The remaining bottles of the order will then be packed in an additional bag or bags and also diverted into the tote 99 so that all the bags corresponding to a single large order will be assembled in a tote 99. When the order is complete in the waiting tote 99, the tote is sent on the conveyer 101 to the manual packaging area 149 where the order will receive any manually dispensed prescriptions and be packed manually into a mailing package for sending to the patient.

Control System Architecture

Figure 9:
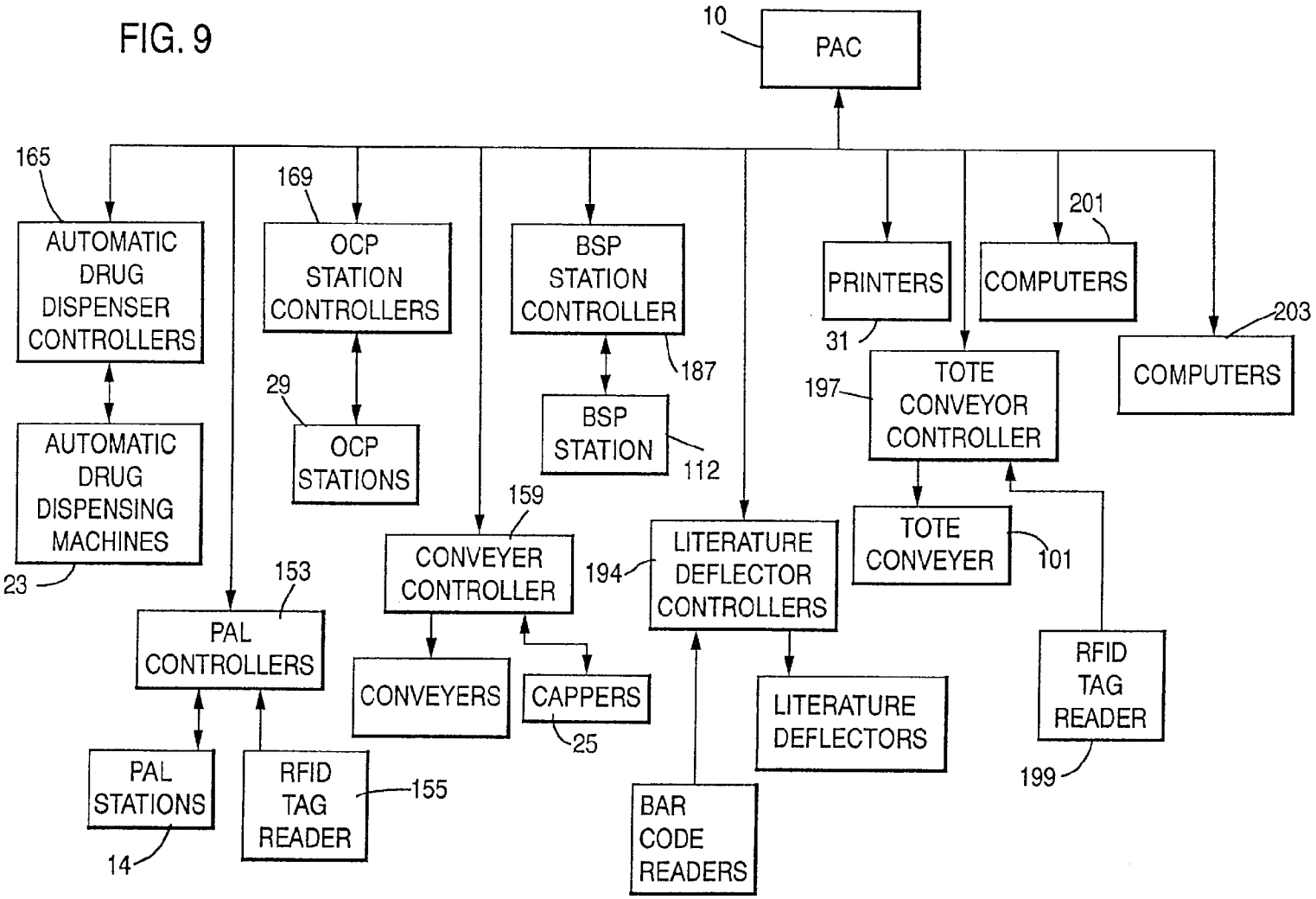
FIG. 9 is a block diagram showing the architecture of the computer system used in the system of the present invention.

As shown in FIG. 9, PAC 10 controls the components of the system through a distributed logic system. PAC 10 receives the prescriptions from the host computer and stores the prescriptions in the order file. PAC 10 controls the PAL stations 14 via controllers 153. PAC 10 makes a batch file for each carrier containing the prescription information for each prescription to be loaded into the corresponding carrier and the exact locations in the carrier where the prescription bottles of the prescriptions are to be placed. These batch files are transmitted to the controller 153 which controls label printers of the PAL stations 14 to print the bottle prescription labels, label the bottles, and control the PAL stations to load the labeled bottles in the scheduled locations in a carrier. Transducers 155 read the carrier identification from the RFID tag when a carrier has been loaded at a PAL station and the loaded carrier is dispatched to an automatic drug dispensing machine and controllers 153 transmit the carrier identification to PAC 10. PAC 10 stores the carrier identifications of the carriers in association with the scheduled locations for the prescription bottles loaded in these carriers and with the corresponding orders so that for each order, PAC can retrieve the carrier identifications and the scheduled locations in the carriers of the prescription bottles for the order.

The conveyer system is controlled by PAC 10 via carrier conveyer controller 159. When the PAL stations have completed loading of the orders in the batch file into a rank of carriers, PAC 10 issues a move instruction to the conveyer controller 159 to cause the conveyers 45 to transport the rank of carriers now filled with labeled empty prescription bottles to the automatic drug dispensing machines 23. The controller 159 also controls the cappers 25.

The automatic drug dispensing machines are controlled by PAC 10 via automatic dispensing machine controllers 165. Each time a dispensing machine 23 indexes a line of carriers in the machine forward one row, the controller 165 for that dispensing machine will report the indexing to PAC 10 which increments the index count for the dispensing machine 23. In the preferred embodiment of the invention, the dispensing machines 23 are indexed synchronously so that only one index count is required to be kept for all four machines. After each indexing of the carrier trains by one row, PAC 10 instructs the controllers 165 to dispense the tablets or capsules from the lower buffers of those dispensers for which the work-to list contain an index number equal to the index count. PAC 10 also instructs the controller 165 to count tablets or capsules into the upper buffers and stage the tablets or capsules in the lower buffers at the appropriate times as described in the abovementioned copending application. When a dispenser exhausts the tablets or capsules from its storage hopper in counting out tablets or capsules into the upper buffer, PAC 10 will wait until the hopper has been replenished and then will instruct the controller 165 to complete the count from that dispenser. If an automatic drug dispensing machine 23 detects an error in counting out tablets or capsules or in the staging of the tablets or capsules in the lower buffer or in releasing the tablets or capsules from the lower buffer into a prescription bottle, the existence of this error will be signaled to the controller 165 which will report the error to PAC 10 which will store the information indicating a potential error in the filling of the bottle in the order file.

The OCP stations 29 are controlled by the PAC 10 via controllers 169. When a rank of four carriers leave automatic drug dispensing machines 23, PAC 10 determines an OCP station 29 to receive the rank of carriers and directs the carrier conveyer controller 159 to control the carrier loop 71 to move the rank of four carriers to the selected OCP station 29 after the bottles in the carriers have been capped. As the carriers travel to the assigned OCP station 29 from the cappers 25, PAC 10 will send autopublish messages to printers 31 to print documents for each order which has been loaded in the rank of carriers and which is to be packed in OCP station. Each of the stations 29 will be assigned one of the printers 31 and the assigned printer will print literature packs for the orders in a rank of carriers in the reverse sequence that the orders are to be unloaded from the corresponding rank of carriers. When a rank of carriers is sent to an OCP station, PAC 10 will send an unload message to the OCP station controller 169 for that station. This unload message will include the information necessary to unload the bottles, and print the patient order ID on a bag to be presented by the bagging machine at the OCP station. The unload message identifies which carriers contain the bottles of each order, the locations of the bottles of each order in each of the carriers and the sequence in which the orders are to be unloaded. Also, bottles of split orders, bottles to be sent to the BSP station 112 and bottles to be sent to the bottle quality assurance station will be identified in the unload message. From this information, the controller 169 controls the OCP station to unload the bottles from the locations in the four carriers on the turntable as specified in the unload message. The OCP station controllers 169 receive the carrier ID information from RFID tag readers and the BIN numbers read by bar code readers from both the bottles unloaded at the station and the information packets at the station. The controllers 169 also operate the tables 102 and gates 103 at the stations 29 to divert into totes those shipping containers which are to be sent to the package quality assurance area 96 or to manual packing 137.

PAC 10 also instructs a BSP controller 187 which controls the BSP station 112. The controller 187 controls the rotatory buffer 113 and controls the printer of the bagging machine 123 to print labels on the bags presented by the bagging machine 123. The controller 187 also receives prescription BIN numbers read from the bottles and the order numbers read from the information packets at the station 112 and controls the diverting mechanism comprising an inclined table and gate at the BSP station 112 to divert selected bags into totes at the BSP station 112. The controller 187 also controls the star wheel 114 to direct bottles received on bottle stream conveyer 108 to the BSP station 112 or to the quality assurance station 109.

The deflectors 89 at the stations 29 and the deflector 127 at the station 112 are controlled by means of controller 194 which receives the patient order ID bar coded on the literature packets read by the bar code readers 87 and 125. The controller 194 verifies that the bar codes read from the literature packs by the bar code reader 87 at an OCP station corresponds with the orders in the unload message received from the PAC 10. The controller 194 operates the deflectors 89 to direct the literature packs into the literature dispensing mechanisms at the OCP station. The controller 194 compares the order identification received from PAC with order numbers read from the literature pack by bar code reader 125 at the BSP station and when a match is detected, controller 194 actuates deflector 127 to direct the literature pack into the literature dispensing mechanism at the BSP station.

PAC 10 controls the tote conveyer 101 by means of a tote conveyer controller 197. The totes on the tote conveyer 101 are identified by RFID tags and these RFID tags are read by an RFID tag reader 199. These tote IDs are transmitted to PAC 10 by the controller 197 so that PAC 10 can match the orders in the totes on the tote conveyer 101 with the tote ID.

PAC 10 also interfaces with computers 201 at the quality assurance area 109 and with computers 203 at the package quality assurance area 96. The computers 201 and 203 provide information to pharmacists or technicians about the orders and prescriptions in the packages and prescription bottles received at these quality assurance areas.

The above-described system automatically dispenses tablets and capsules into prescription bottles, assembles the prescription bottles for a common order into shipping containers, prints literature packs for each order and automatically inserts the literature packs into the shipping containers and prints the mailing labels on the shipping containers so that upon completion of the automatically operated system the order is ready to be mailed.

The above automatic system is accomplished with a very high throughput of orders and, at the same time, provides for checks and balances to make sure that the system is operating properly and provides for automatically diverting orders and bottles for manual inspection for problems in the automatic system that have been detected.

The above description is of a preferred embodiment of the invention and modification may be made thereto without departing from the spirit and scope of the invention which is defined in the appended claims.

We claim:

[1. An automatic prescription filling and packing system comprising pill dispensing machines to automatically count out and dispense pills into prescription bottles in accordance with prescription orders, means to print literature packs customized to said prescription orders, and order consolidation means to present a shipping container for each order, to insert the prescription bottle for said order into such shipping container and to insert, separately from any prescription bottle inserted into the shipping container, the literature pack for said order into such shipping container.]

[2. The system as recited in claim 1, wherein some of said prescription orders include a plurality of prescriptions, said dispensing machine dispensing the pills of the prescriptions of a prescription order into separate prescription bottles, said order consolidation means loading a plurality of prescription bottles of a prescription order containing more than one prescription into a common shipping container with a literature pack for such prescription order.]

[3. An automatic prescription filling and packing system as recited in claim 1 further comprising means to apply printed prescription labels to said prescription bottles prior to the insertion of said prescription bottles into a shipping container.]

[4. A prescription dispensing and packing system comprising a plurality of bottle carriers each having receptacles to receive a plurality of pill bottles, means to receive orders for prescriptions, means to load prescription bottles corresponding to the prescriptions of said orders into scheduled locations in said carriers, a prescription pill dispensing machine, means to transport said carriers with said prescription bottles through said dispensing machine, said dispensing machine dispensing the pills of said orders into the bottles in said carriers in accordance with the scheduled locations of the pill bottles in said carriers, order consolidation means receiving carriers from said dispensing machine and presenting shipping containers to be filled, each shipping container corresponding to an order, said order consolidation means unloading bottles from said carriers and loading bottles into shipping containers corresponding to the orders, said order consolidation means determining each bottle to go in each shipping container from the scheduled location of such bottle in a carrier.]

[5. A system as recited in claim 4, wherein said order consolidation means comprises a turntable to receive a plurality of said carriers, a robotic arm to unload prescription bottles from the carriers on said turntable and means to transport the bottles unloaded from the carriers into shipping containers.]

[6. A system as recited in claim 4, including a plurality of dispensing machines each receiving carriers with bottles and dispensing pills into the prescription bottles corresponding to orders in accordance with the scheduled locations of said prescription bottles in said carriers, conveying means organizing said carries into ranks of a plurality of carriers and passing a rank of carriers through said dispensing machines synchronously, said system further comprising a plurality of said order consolidation means and conveyer means to direct all the carriers of a rank to the same order consolidation means.]

[7. A system as recited in claim 4, wherein some of said orders include a plurality of prescriptions, said automatic dispensing machine dispensing each prescription of an order in a separate bottle, said order consolidation means loading a plurality of bottles of an order into a common shipping container.]

[8. A system for assembling prescriptions by prescription order wherein an order may include more than one prescription, comprising a multiplicity of carriers each having the capability of receiving a multiplicity of prescription bottles in scheduled locations, means responsive to an order to provide prescription bottles filled with pharmaceuticals in accordance with the prescriptions of said patient order in one or more of said carriers, an order consolidation and packing station, means to assemble a plurality of carriers at said order and packing station, and packing means at said order and consolidation station to remove the prescription bottles of said order from the scheduled locations in the carriers of said plurality and pack the bottles of said order in a container.]

[9. The system as recited in claim 8 further comprising means to print literature for said order and pack said literature in said container at said consolidation and packing station.]

[10. A system for sorting prescriptions by prescription order comprising a carrier having the capability of receiving a multiplicity of prescription bottles in assigned locations, means responsive to a prescription of an order to provide a prescription bottle filled with pharmaceuticals in accordance with said prescription in an assigned location in said carrier, an order consolidation and packing station comprising means to receive said carrier and remove said prescription bottle from said assigned location in said carrier and pack said prescription bottle in a container corresponding to said order.]

[11. A system as recited in claim 10 further comprising means to print literature corresponding to said order and pack said literature in said container at said order consolidation and packing station.]

[12. A method of sorting prescription bottles by prescription order comprising identifying prescription bottles corresponding to each order, placing the prescription bottles of each order in scheduled locations in carriers, each carrier having a multiplicity of locations to receive prescription bottles, maintaining a record for each order of the identification of the carriers containing the prescription bottles of each order and the scheduled location in said carriers of each prescription bottle of each order, and removing the prescription bottles from the scheduled locations in said carriers in accordance with said record and placing the prescription bottles of each order in a separate container.]

[13. A method as recited in claim 12 further comprising applying a label to each prescription bottle identifying the prescription in the order corresponding to said prescription bottle.]

[14. A method as recited in claim 12 further comprising filling said prescription bottles with pills in accordance with said patient orders after said prescription bottles have been placed in scheduled locations in said carrier.]

[15. A method as recited in claim 13 further comprising filling said prescription bottles after said prescription bottles have been labeled and placed in scheduled locations in said carriers.]

*16. An automatic prescription filling and packing system comprising:*

*at least one computer that receives information comprising prescription orders;*

*at least one pill dispensing machine operatively connectable to said at least one computer to automatically count out and dispense pills into one or more prescription bottles in accordance with the prescription orders;*

*an order consolidation and packing (OCP) station operatively connected to said at least one computer, and comprising:*

*a printer that prints one or more literature packs customized to the prescription orders;*

*at least one reader that reads identification information on the one or more prescription bottles and the one or more literature packs to determine at least one prescription bottle and at least one literature pack corresponding to at least one prescription order; and*

*a packing mechanism that packs the at least one prescription bottle and the at least one literature pack corresponding to the at least one prescription order into at least one shipping container and places identification information on the at least one shipping container; and*

*at least one reader that reads a first identification information on the one or more prescription bottles, a second identification information on the one or more literature packs, and a third identification information on the at least one shipping container to determine if the bottle, literature pack and shipping container identification information correspond to the same prescription order, wherein the at least one shipping container receives the one or more prescription bottles and the one or more literature packs when the identification information corresponds to the same prescription order.*

*17. The system as recited in claim 16 wherein at least some of the prescription orders include a plurality of prescriptions, at least one of said dispensing machines dispensing the pills of the prescriptions of a prescription order into separate prescription bottles.*

*18. The system as recited in claim 16 wherein the identification information is applied to the one or more prescription bottles prior to dispensing the prescription into the one or more prescription bottles.*

*19. The system as recited in claim 16 further comprising:*

*a plurality of bottle carriers each having receptacles to receive a plurality of bottles;*

*a loading system that loads bottles corresponding to the prescriptions orders in said carriers; and*

*a mechanism that transports said carriers with the bottles through said at least one pill dispensing machine, said at least one pill dispensing machine dispensing the pills of the prescription orders into the bottles in said carriers.*

*20. The system as recited in claim 16, wherein when at least two dispensing machines are used, the bottles are transferred*

*to said OCP station when the bottles for a prescription order are within a single rank of carriers.*

*21. The system as recited in claim 20, wherein some of the prescription orders include a plurality of prescriptions, said at least one dispensing machine dispensing each prescription in separate bottles.*

*22. The system as recited in claim 16 further comprising a bottle sortation and packing (BSP) station, wherein when at least two dispensing machines are used, said BSP station receives bottles for a prescription order contained within at least two ranks of carriers.*

*23. The system as recited in claims 19, 20 or 22 wherein said carriers hold different size bottles.*

*24. The system as recited in claims 19, 20 or 22 wherein the bottles are capped in the carriers.*

*25. The system as recited in claims 20 or 22, wherein the identification information is applied to each of the prescription bottles prior to dispensing pharmaceuticals into the respective bottles.*

*26. The system as recited in claims 20 or 22 wherein the ranks of carriers move synchronously during dispensing.*

*27. The system as recited in claim 16 further comprising a quality assurance area that receives the shipping container when said at least one reader provides an indication that the identification information do not correspond with a common prescription order.*

*28. The system as recited in claim 16 wherein each of the bottle identification information, literature pack identification information and shipping container identification information comprise a bar code.*

*29. The system as recited in claim 16 further comprising:*

*a plurality of carriers, each carrier holding a plurality of bottles;*

*a fourth identification information affixed to each of said plurality of carriers; and*

*a reading device that reads the carrier identification information prior to dispensing to ensure that at least one of said plurality of carriers holds bottles corresponding to the prescription order.*

*30. The system as recited in claim 16 further comprising a bottle quality assurance area, wherein when said at least one reader detects a discrepancy in bottle identification information, the bottle is transported to the bottle quality assurance area.*

*31. The system as recited in claim 30 further comprising a bottle sortation and packing (BSP) station comprising:*

*at least one buffer area that receives bottles with a resolved discrepancy; and*

*a bagger that presents a shipping container and receives the bottle having the resolved discrepancy and a customized literature pack.*

*32. The system as recited in claim 16 wherein said at least one reader detects a discrepancy in the second identification information, the shipping container that contains the literature package having the identifier discrepancy is transported to a quality assurance area.*

*33. The system as recited in claim 16 wherein said packing mechanism comprises a printer that prints a shipping address on the shipping container.*

* * * * *